(12) United States Patent
Yoshida et al.

(10) Patent No.: US 7,490,517 B2
(45) Date of Patent: Feb. 17, 2009

(54) SENSOR ATTACHMENT STRUCTURE AND ULTRASONIC SENSING DEVICE

(75) Inventors: Takahiko Yoshida, Okazaki (JP); Makiko Sugiura, Hekinan (JP); Yasuyuki Okuda, Aichi-gun (JP); Yuta Hasebe, Obu (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 11/488,140

(22) Filed: Jul. 18, 2006

(65) Prior Publication Data

US 2007/0079661 A1     Apr. 12, 2007

(30) Foreign Application Priority Data

Oct. 12, 2005  (JP)  ............................. 2005-297559

(51) Int. Cl.
*G01H 5/00*  (2006.01)
(52) U.S. Cl. ...................................................... 73/597
(58) Field of Classification Search .................... 73/597
See application file for complete search history.

(56) References Cited

U.S. PATENT DOCUMENTS

| | | | | |
|---|---|---|---|---|
| 3,636,756 | A | * | 1/1972 | White ........................... 73/639 |
| 4,794,930 | A | * | 1/1989 | Machida et al. .............. 600/459 |
| 5,038,615 | A | * | 8/1991 | Trulson et al. ................. 73/597 |
| 5,247,003 | A | | 9/1993 | Terada et al. |
| 6,758,094 | B2 | * | 7/2004 | Miller .......................... 73/632 |
| 6,876,127 | B2 | | 4/2005 | Mitsuoka et al. |
| 6,891,314 | B2 | | 5/2005 | Sato et al. |
| 2002/0130770 | A1 | | 9/2002 | Keyworth et al. |

FOREIGN PATENT DOCUMENTS

| | | |
|---|---|---|
| JP | A-8-182090 | 7/1996 |
| JP | A-10-123236 | 5/1998 |
| JP | A-11-133136 | 5/1999 |
| JP | A-2002-58097 | 2/2002 |
| JP | A-2003-284182 | 10/2003 |
| JP | A-2005-024351 | 1/2005 |
| JP | A-2005-167820 | 6/2005 |

OTHER PUBLICATIONS

Office Action issued from the German Patent and Trademark Office in corresponding patent application No. 10 2006 035 607.1 dated Jun. 16, 2008.

* cited by examiner

*Primary Examiner*—Robert R Raevis
(74) *Attorney, Agent, or Firm*—Posz Law Group, PLC (57) ABSTRACT

A sensor attachment structure includes a sound receiving member for receiving an ultrasound, an ultrasonic sensor attached to the sound receiving member. The ultrasonic sensor includes a semiconductor substrate having first and second surfaces opposite to each other and a substrate recess portion recessed from the first surface of the semiconductor substrate so as to form a membrane in the semiconductor substrate. Furthermore, a cap member is located between the sound receiving member and the semiconductor substrate to cover the second surface of the semiconductor substrate. In addition, the cap member has a first surface bonded to the sound receiving member, and a second surface that is bonded to the second surface of the semiconductor substrate at an outer periphery section of the membrane while having a gap between the cap member and the membrane.

20 Claims, 5 Drawing Sheets

SENSOR ATTACHMENT STRUCTURE AND ULTRASONIC SENSING DEVICE

CROSS REFERENCE TO RELATED APPLICATION

This application is based on and incorporates herein by reference Japanese patent application No. 2005-297559 filed on Oct. 12, 2005.

FIELD OF THE INVENTION

The present invention relates to an ultrasonic sensing device and a sensor attachment structure for attaching an ultrasonic sensor to a sound receiving member.

BACKGROUND OF THE INVENTION

Recently, an ultrasonic sensor is mounted to a vehicle to measure a position, a direction or a distance of an object around the vehicle.

The ultrasonic sensor is mounted to a sound receiving member like a bumper, a body or a head light. When an ultrasound is transmitted to the object from a transmitter which is formed separately from or together with the ultrasonic sensor, the ultrasound is reflected by the object and received by the sound receiving member. The sound receiving member accordingly vibrates and the ultrasonic sensor detects the vibration.

JP 2002-58097A proposes a piezoelectric substance as the ultrasonic sensor. In JP 2003-284182A, a membrane type ultrasonic sensor is proposed as the ultrasonic sensor.

The membrane type ultrasonic sensor includes a semiconductor substrate, at a surface of which a recess is formed. A portion of the semiconductor substrate corresponding to the bottom of the recess is thin and is therefore serves as a membrane. Thus, the membrane type ultrasonic sensor has a shape similar to that of a semiconductor substrate (for example, a semiconductor pressure sensor) having a diaphragm on its surface.

The membrane type ultrasonic sensor detects the ultrasound based on a vibration of the membrane. The membrane is proposed to be a thin film made of a piezoelectric substance or a capacitance type membrane including a detection electrode similar to a fixed electrode or a movable electrode.

The membrane type pressure sensor is attached, similarly to the semiconductor pressure sensor, to the sound receiving member at a surface on which the recess is formed. This is because the surface is almost flat except for the recess.

In this case, the recess is positioned between the sound receiving member and the membrane. The vibration of the sound receiving member is therefore transferred to the membrane through the air in the recess. A transferring path of the vibration from the receiving member to the membrane thus becomes longer by an amount of deepness of the recess. Efficiency in transferring the vibration may accordingly get worse.

In the case that the detection electrode is formed at a front side of the membrane not facing the recess, the efficiency in transferring the vibration becomes higher when the vibration is transferred faster to the front side than to a rear side of the membrane opposite to the front side.

In view of this, the sound receiving member may be simply attached to a front surface of the semiconductor substrate at which the front side of the membrane is formed.

However, as described in JP 2003-284182A, the surfaces of the membrane are uneven because of a wiring, a terminal or the electrode. It is therefore difficult to directly attach one of the surfaces of the membrane to the sound receiving member.

In addition, the membrane which is thin and fragile may suffer damage when the surface of the membrane is attached directly to the sound receiving member.

SUMMARY OF THE INVENTION

It is therefore an object of the present invention to provide a sensor attachment structure in which a front surface (second surface) of a semiconductor substrate of an ultrasonic sensor faces toward a sound receiving member.

It is another object of the present invention to provide an ultrasonic sensing device provided with a cap member in an ultrasonic sensor.

According to an aspect of the present invention, a sensor attachment structure includes a sound receiving member for receiving an ultrasound, and an ultrasonic sensor attached to the sound receiving member. The ultrasonic sensor includes a semiconductor substrate having first and second surfaces opposite to each other and a substrate recess portion recessed from the first surface of the semiconductor substrate so as to form a membrane in the semiconductor substrate. Furthermore, a cap member is located between the sound receiving member and the semiconductor substrate to cover the second surface of the semiconductor substrate, and the membrane is provided such that the ultrasonic sensor detects the ultrasound based on the vibration of the membrane. In addition, the cap member has a first surface bonded to the sound receiving member, and a second surface that is bonded to the second surface of the semiconductor substrate at an outer periphery section of the membrane while having a gap between the cap member and the membrane.

Accordingly, the surface of the membrane is protected by the cap member. Therefore, it is possible to install the ultrasound sensor to the sound receiving member while the membrane of the ultrasound sensor is positioned at the side of the sound receiving member. In addition, because the cap member and the membrane are bonded with each other while the gap is provided between them, it is possible to compensate unevenness of the surface of the membrane and fragileness of the membrane.

For example, a dimension of the gap between the cap member and the membrane can be made smaller than a recessed dimension of the recess portion. Furthermore, the sound receiving member may be provided with a groove that is formed on an attachment surface in a shape of loop surrounding a section of the attachment surface, to which the ultrasonic sensor is attached. Alternatively, a guide member for guiding the ultrasonic sensor to the sound receiving member when the ultrasonic sensor is attached to the sound receiving member may be provided.

In addition, a bump through which the second surface of the cap member is attached to the second surface of the semiconductor substrate at the outer periphery section of the membrane may be provided.

Furthermore, at least one of the cap member and the semiconductor substrate can be provided with an escape hole through which air in the gap between the cap member and the membrane escape. Alternatively, the gap may be filled with a material having an acoustic impedance that is higher than an acoustic impedance of gas.

According to another aspect of the present invention, an ultrasonic sensing device to be mounted to a sound receiving member includes an ultrasonic sensor that is provided with a semiconductor substrate having first and second surfaces opposite to each other and a substrate recess portion recessed from the first surface of the semiconductor substrate so as to form a membrane in the semiconductor substrate, and a cap member located to cover the second surface of the semiconductor substrate. In this ultrasonic sensing device, the membrane is provided such that the ultrasonic sensor detects an ultrasound based on a vibration of the membrane. Furthermore, the cap member has a first surface to be mounted to the sound receiving member, and a second surface that is bonded to the second surface of the semiconductor substrate at an outer periphery section of the membrane while having a gap between the cap member and the membrane. Accordingly, it is possible to protect the membrane with the cap member, even when the ultrasonic sensor is attached to the sound receiving member while the second surface having the membrane faces toward the sound receiving member.

According to a further another object of the present invention, an ultrasonic sensing device to be mounted to a sound receiving member, comprises: an ultrasonic sensor which includes a semiconductor substrate having first and second surfaces opposite to each other and a plurality of recesses recessed from the first surface so as to form a plurality of membranes corresponding to the recesses in the semiconductor substrate, respectively; and a cap member located to cover the second surface of the semiconductor substrate. The ultrasonic sensor detects the ultrasound based on vibrations of the membranes. In the ultrasonic sensing device, the cap member has a first surface to be mounted to the sound receiving member, and a second surface that is bonded to the second surface of the semiconductor substrate at outer periphery sections of the membranes while having a plurality of gaps with the membranes, respectively. Furthermore, the cap member has a partition wall portion on the second surface, for partitioning the gaps from each other, and the partition wall portion is bonded to an adhesion portion of the semiconductor substrate between the membranes. Here, the partition wall portion can be provided to suppress interference between vibrations of the membranes.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Hereafter, embodiments of the present invention will be described with reference to FIGS. 1 to 9. In the embodiments, members which are identical or almost identical are given the same reference numeral.

First Embodiment

Figure 1:
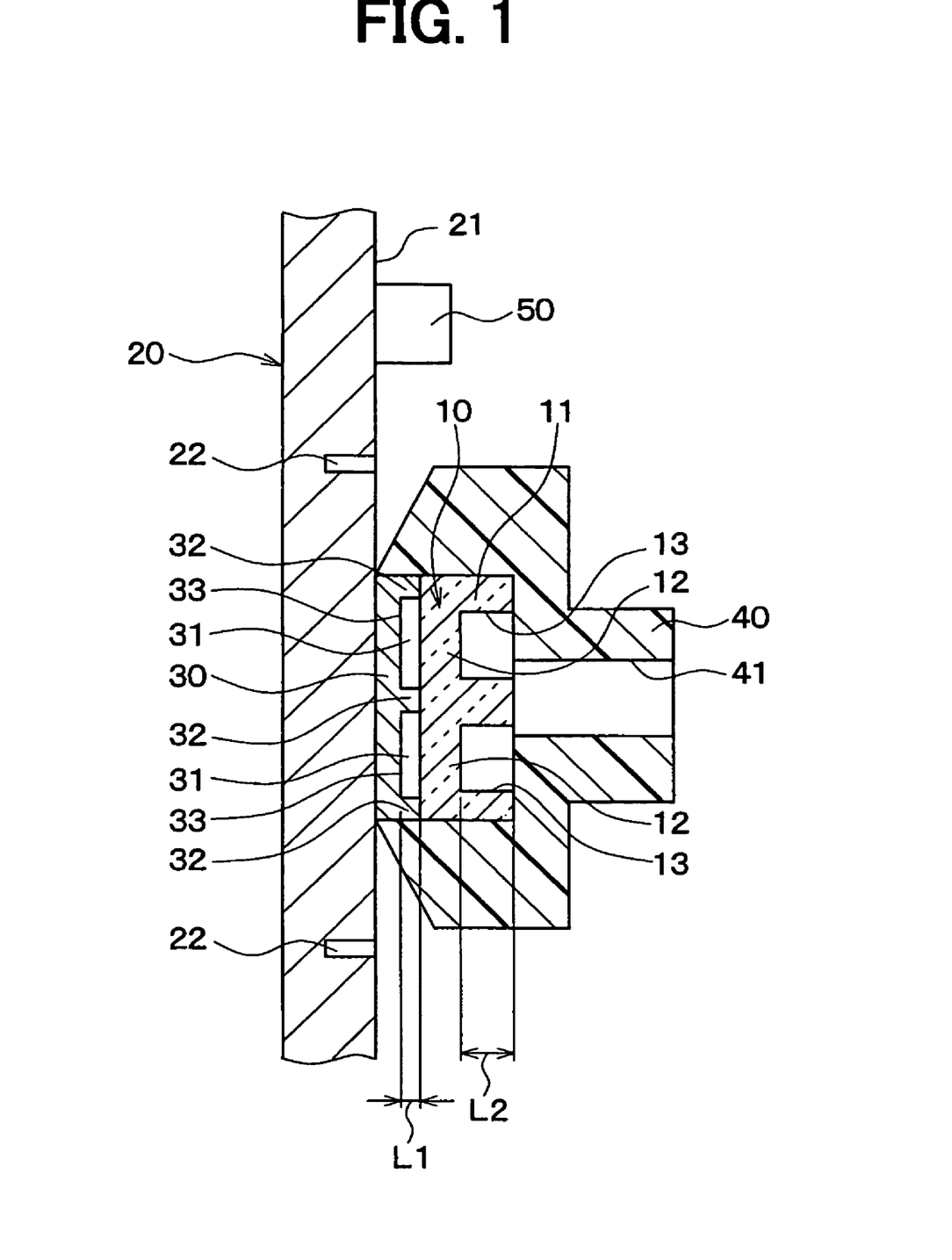
FIG. 1 is a cross sectional view of an ultrasonic sensing device according to a first embodiment of the present invention, showing a attachment structure for attaching an ultrasonic sensor to a sound receiving member.

An ultrasonic sensing device according to the first embodiment of the present invention is installed to a vehicle and includes, as shown in FIG. 1, an ultrasonic sensor 10, a sound receiving member 20, a cap member 30, a molding resin 40 and the ultrasound transmitter 50. The ultrasonic sensor 10 is attached to the sound receiving member 20. The ultrasonic sensor 10 is for detecting a distance between the vehicle and an obstacle around the vehicle and a direction from the vehicle to the obstacle.

The sound receiving member 20 is a bumper of the vehicle and is made of resin (for example, polypropylene) having a thickness of several millimeters. The sound receiving member 20 may be a body of the vehicle and may be made of plate steel.

In FIG. 1, the left and the right of the sound receiving member 20 are located to an outside and an inside of the vehicle, respectively. The ultrasonic sensor 10 is attached to a sensor attachment surface 21 which is a surface of the sound receiving member 20 and is facing the inside of the vehicle.

The ultrasonic sensor 10 is of membrane type and includes a semiconductor substrate 11 (for example, a silicone substrate). The semiconductor substrate 11 includes membranes 12 at its front surface (that is, a surface to the left in FIG. 1).

Figure 2:
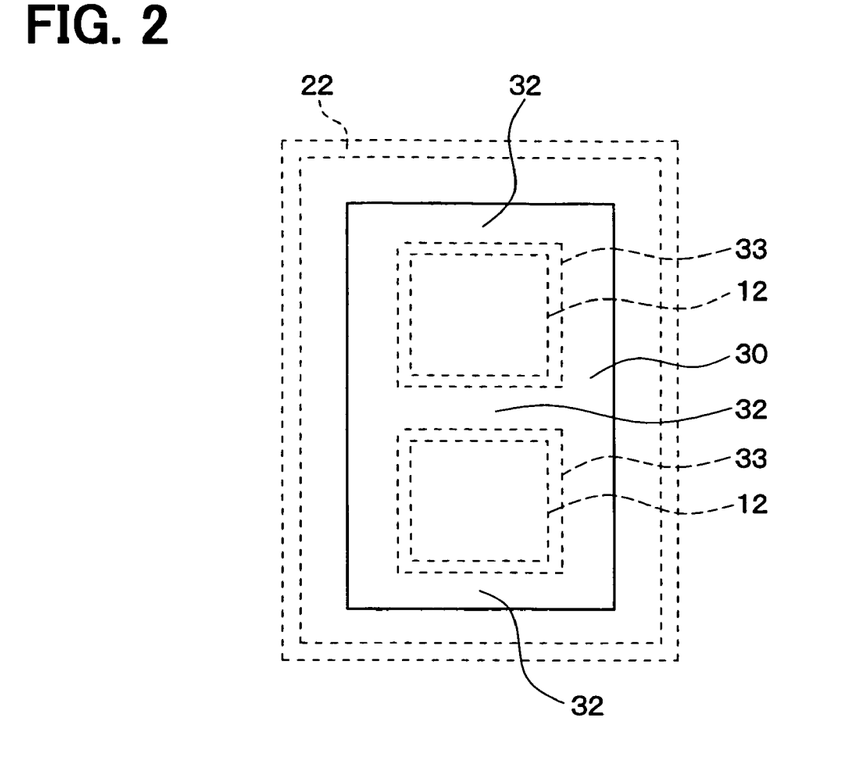
FIG. 2 is a left side view of a cap member shown in FIG. 1.

The membranes 12 are thin portions which are at the front surface side of the semiconductor substrate 11 and are positioned at bottoms of recesses 13 formed at a rear surface (that is, a surface to the right in FIG. 1) of the semiconductor substrate 11. As shown in FIG. 2, the number of the recesses 13, which are arranged on the same surface of the semiconductor substrate 11, is two. The number of the membranes 12 is also two and the two membranes 12 are formed approximately at the same positions with the two recesses 13, respectively.

The membranes 12 may be thin and made of piezoelectric matter or may be detection electrodes (for example, fixed electrodes or movable electrodes) having a shape of a thin membrane. The membranes 12 vibrate in accordance with a vibration of the sound receiving member 20 caused by an ultrasound. The ultrasound is detected based on the vibration of the membranes 12.

The ultrasonic sensor 10 can be made through a semiconductor process. The ultrasonic sensor 10 is located with the front surface of the semiconductor substrate 11 facing the sound receiving member 20.

The cap member 30 is located between the front surface of the semiconductor substrate 11 and the sound receiving member 20 to cover the front surface of the semiconductor substrate 11. The cap member 30 may be made of metal (for example, aluminum), ceramics or resin and has a shape of a plate.

A surface of the cap member 30 facing the front surface of the semiconductor substrate 11 has an adhesion part which is bonded, by means of adhesion (for example, epoxy resin), to a section of the front surface surrounding the membranes 12. Recessed part 33 are provided on the surface of the cap member 30 facing the front surface of the membranes 12, such that gaps 31 are formed between the cap member 30 and the membranes 12 of the semiconductor substrate 11.

The number of the recessed parts 33 is two, and the two recessed parts 33 are therefore located at positions corresponding to the two gaps 31, respectively.

The recessed parts 33 are surrounded by a wall portion 32 which includes the adhesion part at its end. The wall portion 32 separates the two recessed parts 33 from each other. The wall portion 32 thus blocks interference between vibrations of the respective membranes 12.

As shown in FIG. 2, each of the membranes 12 has a shape of a rectangular plane. Each of the recessed parts 33 has a shape of a rectangular plane having a size which is the same as or slightly larger than that of the membranes 12. The wall portion 32 and recessed parts 33 are formed as a single body by die forming, cutting, or the like.

The other surface of the cap member 30 is bonded to the sound receiving member 20 by means of adhesion (for example, epoxy resin).

The cap member 30 and the ultrasonic sensor 10 are attached as a single unit to the sound receiving member 20. The cap member 30 and the ultrasonic sensor 10 are sealed by a molding resin (for example, epoxy resin) 40.

The molding resin 40 serves as a wrapping which seals the cap member 30 and the ultrasonic sensor 10 to assemble them to be a single unit and also serves as a wiring member.

Terminals (not shown; for example, lead frames) are formed together with the molding resin 40. The terminals and the ultrasonic sensor 10 are connected in the molding resin 40 through bonding wires or the like.

An opening portion 41 is formed in the molding resin 40. The terminals can be connected with external electrical devices through the opening portion 41. Thus, a signal from the ultrasonic sensor 10 is outputted to the external devices through the molding resin 40.

As shown in FIG. 1, a groove 22 having a shape of rectangular loop which surrounds a section of the sensor attachment surface 21, to which the ultrasonic sensor 10 is attached. In FIG. 2, the groove 22 is shown by dashed lines surrounding the wall portion 32. That is, the groove 22 is located to surround the ultrasonic sensor 10.

An ultrasound transmitter 50 is located on the sensor attachment surface 21 and is for transmitting an ultrasound out of the sound receiving member 20. The ultrasound transmitter 50 may be, for example, of piezoelectric type.

The ultrasonic sensor 10 is mounted to the sound receiving member 20 in the method described above, and therefore has a attachment structure described above to the sound receiving member 20. The ultrasonic sensor 10 detects an ultrasound which is transmitted from the ultrasound transmitter 50 to the outside of the vehicle, reflected by an obstacle, and received by the sound receiving member 20.

When the ultrasound is received by the sound receiving member 20, the sound receiving member 20 vibrates caused by the ultrasound. The vibration of the sound receiving member 20 is transferred through the cap member 30 and the gaps 31 to the membranes 12, which vibrates accordingly.

A signal based on the vibration of the membranes 12 is outputted from the ultrasonic sensor 10 through the molding resin 40 as a wiring member to an external device. The distance between the obstacle and the vehicle can be calculated based on a length of a period which starts when the ultrasound transmitter 50 transmits the ultrasound and ends when the ultrasonic sensor 10 detects the ultrasound.

In addition, the ultrasonic sensor 10 has two membranes 12 which are separated by the wall portion 32 of the cap member 30 and suppresses interference between vibrations of the two membranes 12. That is, the wall portion 32 located between the two membranes 12 serves as a sound separating wall. It is therefore possible to independently detect different vibrations by means of respective membranes 12.

In this case, it is possible to detect the direction of the obstacle by making a triangular surveying. More specifically, because the ultrasound reflected by the obstacle reaches the two respective membranes 12 at different times, the direction of the obstacle can be detected by using ultrasound reached to the respective membranes 12 at the different times.

In addition, a thickness L1 of the gaps 31 (that is, a length between the recessed parts 33 and the membranes 12) may be smaller than deepness L2 of the recesses 13. In this case, a transferring path of the vibration from the sound receiving member 20 to the membranes 12 is shorter than the deepness L2 of the recesses 13. Transmitting efficiency of the vibration is therefore improved.

In addition, the groove 22 formed on the sensor attachment surface 21 surrounds the ultrasonic sensor 10. The groove 22 blocks unwanted vibrations from out of the groove 22 and therefore improves sensitivity of the ultrasonic sensor 10.

As described above, the surfaces of the membranes 12 are protected by the cap member 30 and the front surface of the semiconductor substrate 11 is attached to the sound receiving member 20 through the cap member 30. It is therefore possible to install the ultrasonic sensor 10 to the sound receiving member 20 with a membrane side of the ultrasonic sensor 10 facing the sound receiving member 20.

Second Embodiment

Hereafter, an ultrasonic sensing device, an attaching method and an attachment structure for attaching an ultrasonic sensor according to the second embodiment of the present invention will be described with reference to FIG. 3.

In this embodiment, a surface of the cap member 30 is attached through a bump 60 to a section of the front surface of the semiconductor substrate 11, surrounding the membranes 12. The bump 60 may be a gold bump or a solder bump.

In this case, filling material 61 made of adhesion (for example, resin) is applied around the bump 60 in order to seal and partition the gaps 31 between the surface of the cap member 30 and the membranes 12. The bump 60 and the filling material 61 constitute the wall portion 32 described in the first embodiment.

By using the bump 60, the semiconductor substrate 11 and the cap member 30 can be easily connected electrically through the bump 60, in the case that wirings are connected with the cap member 30 and that the cap member 30 is used as a wiring member.

Third Embodiment

Hereafter, an ultrasonic sensing device, an attaching method and an attachment structure for attaching an ultrasonic sensor according to the third embodiment of the present invention will be described with reference to FIG. 4.

Figure 4:
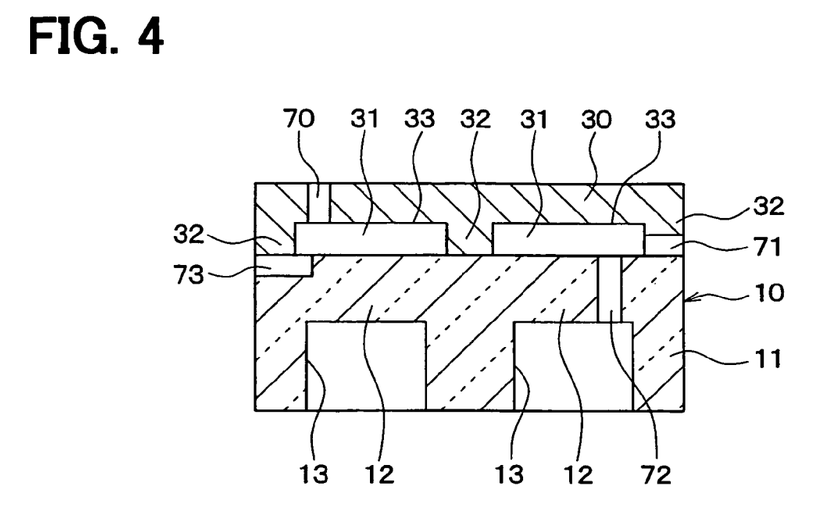
FIG. 4 is a cross sectional view of an ultrasonic sensor and a cap member according to a third embodiment of the present invention.

As shown in FIG. 4, escape holes 70, 71 and escape holes 72, 73 are formed in the cap member 30 and the semiconductor substrate 11 and are for letting air in the gaps 31 get out of the ultrasonic sensing device.

More specifically, the escape hole 70 is formed by a cutting process to penetrate the cap member 30 in its thickness direction. The escape hole 71 is formed by a cutting process at an end of the wall portion 32. The escape hole 72 is formed by a cutting process or an etching process to penetrate the membranes 12 in its thickness direction. The escape hole 73 is formed by a cutting process or an etching process at an outer edge of the semiconductor substrate 11. Thus, the gaps 31 are connected with the outside of the ultrasonic sensing device through the escape holes 70-73.

Pressure of the gaps 31 between a surface of the cap member 30 and the membranes 12 changes according to change of temperature. The change of the pressure causes efficiency in transferring the vibrations. It is therefore possible to suppress the change of the pressure in the gaps 31 caused by the change of the temperature, by forming the escape holes 70-73.

The escape holes or notches may be formed only in the cap member 30 or only in the ultrasonic sensor 10, if the holes or the notches are formed to let the air in the gaps 31 escape. A shape of the escape holes or notches may be any one of shapes for the escape holes 70, 72 and the escape holes 71, 73, or may be of any kind.

Fourth Embodiment

Figure 3:
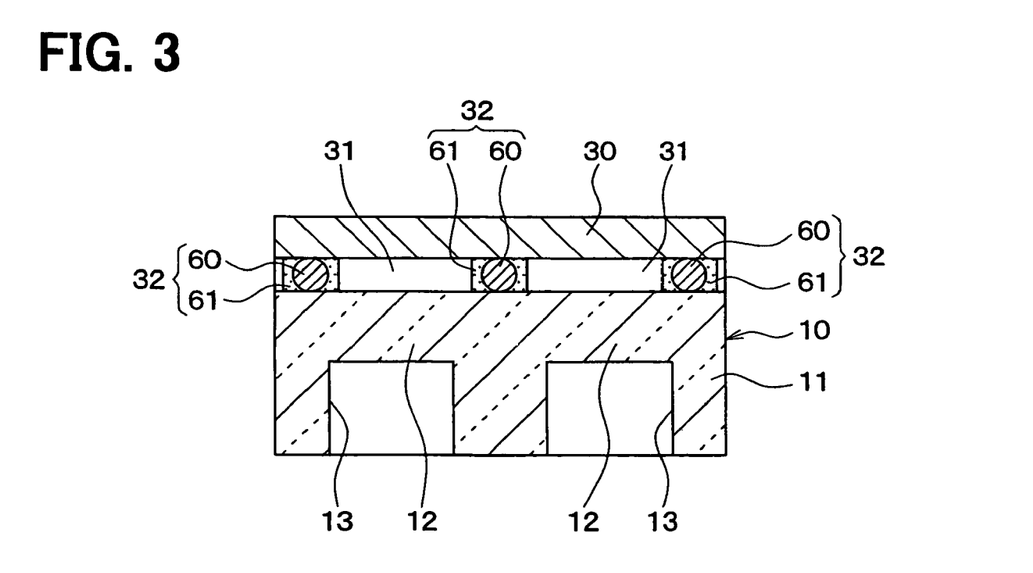
FIG. 3 is a cross sectional view showing an ultrasonic sensor and a cap member according to a second embodiment of the present invention.

In the attachment structures of the first embodiment and the second embodiment shown in FIGS. 1 to 3, material having an acoustic impedance higher than gas (for example, air) may be filled in the gaps 31 between the recessed parts 33 and the membranes 12.

The acoustic impedance is a well-known characteristic indicating how easily the vibrations are transferred through specific material. Liquid like fluorine oil or silicone oil and gel material like fluorine gel or silicone gel have an acoustic impedance higher than gas.

It is possible to improve efficiency in transferring the vibrations through the gaps 31 by filling the material described above in the gaps 31, because the vibrations are transferred to the membranes 12 through the material.

Fifth Embodiment

Hereafter, an ultrasonic sensing device, an attaching method and an attachment structure according to the fifth embodiment of the present invention will be described with reference to FIG. 5.

Figure 5:
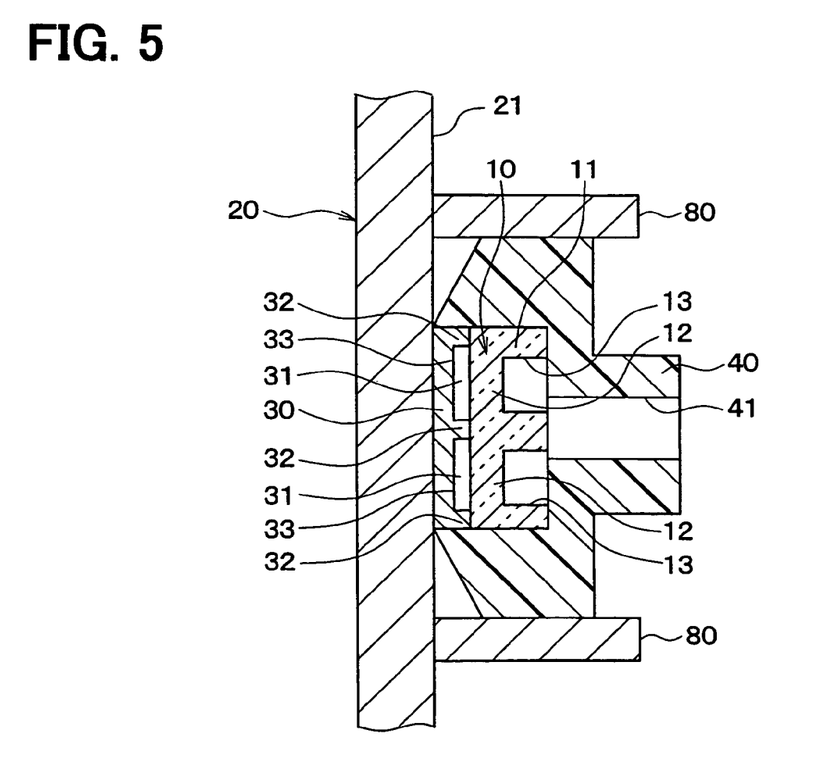
FIG. 5 is a cross sectional view of an ultrasonic sensing device according to a fifth embodiment of the present invention, showing a structure for attaching an ultrasonic sensor to a sound receiving member.

As shown in FIG. 5, a guide member 80 is installed to the sound receiving member 20 and is for guiding the ultrasonic sensor 10 to the sound receiving member 20 when the ultrasonic sensor 10 is attached to the sound receiving member 20.

The guide member 80 has a shape of a wall sticking out along the outer shape of the molding resin 40. The guide member 80 is formed at all peripheries of the molding resin 40. Otherwise, the guide member 80 may include two walls located at opposing positions. The guide member 80 may be formed as a single body together with the sound receiving member 20. Otherwise, the guide member 80 may be formed separately from the sound receiving member 20.

According to this embodiment, the ultrasonic sensor 10 is guided by the guide member 80 to the sound receiving member 20 when the ultrasonic sensor 10 is installed to the sound receiving member 20. It is therefore easy to adjust a position of the ultrasonic sensor 10 relative to the sound receiving member 20. This embodiment can be applied to each of above embodiments.

Sixth Embodiment

Hereafter, an ultrasonic sensing device and an attachment structure for attaching an ultrasonic sensor according to the sixth embodiment of the present invention will be described with reference to FIGS. 6 and 7.

Figure 6:
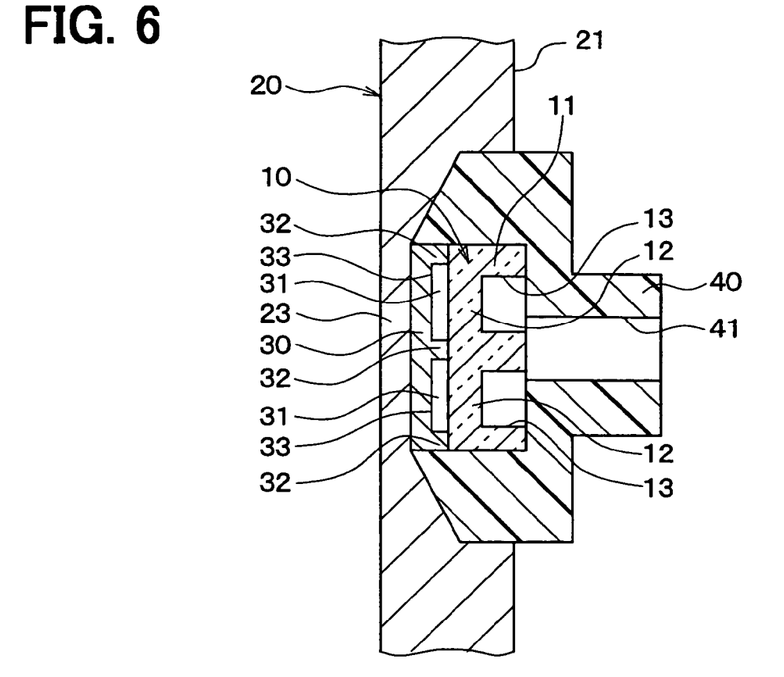
FIG. 6 is a cross sectional view of an ultrasonic sensing device according to a sixth embodiment of the present invention, showing a structure for attaching an ultrasonic sensor to a sound receiving member.

As shown in FIG. 6, a portion of the sound receiving member 20 to which the ultrasonic sensor 10 is installed is a thin portion 23. More specifically, the thin portion 23 is formed by providing a dent (recess) on the sensor attachment surface 21 which is one of the surfaces of the sound receiving member 20 on which the ultrasonic sensor 10 is mounted.

The thin portion 23 can vibrate more sensitively to the received ultrasound and therefore improves sensitivity of the ultrasonic sensor 10. This embodiment can be applied to each of above embodiments.

Figure 7:
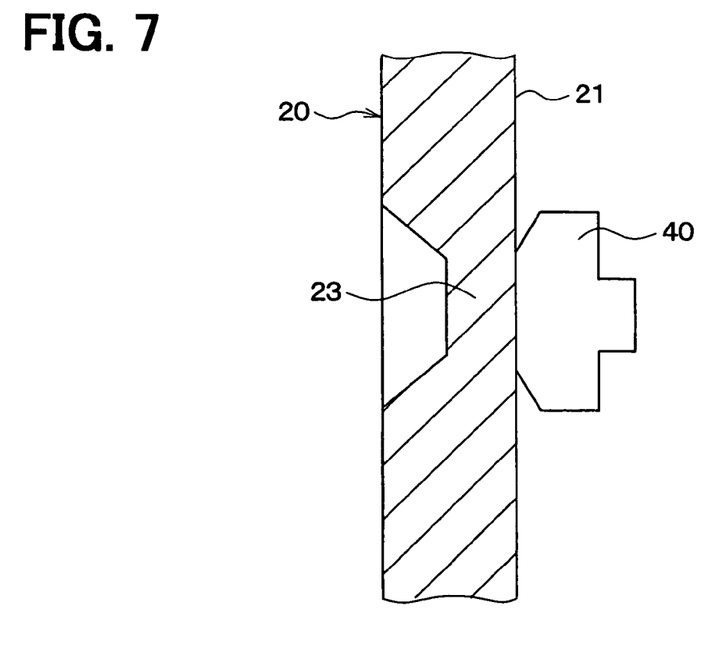
FIG. 7 is a cross sectional view of an ultrasonic sensing device according to the sixth embodiment of the present invention, showing another structure for attaching an ultrasonic sensor to a sound receiving member.

In FIG. 7 where the molding resin 40 is shown in a simple manner and the ultrasonic sensor 10 is not shown, the thin portion 23 is formed by providing a dent (recess) on the surface of the sound receiving member 20 opposite to the sensor attachment surface 21. More specifically, the dent on the opposite surface may have a shape tapering outward. In this case, it is easy to collect the ultrasound.

Seventh Embodiment

Figure 8:
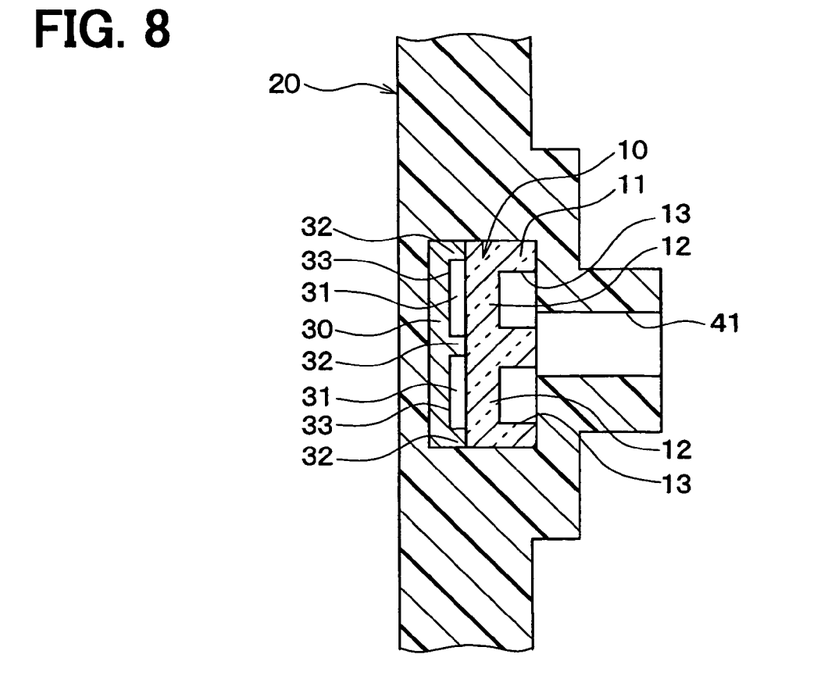
FIG. 8 is a cross sectional view of an ultrasonic sensing device according to a seventh embodiment of the present invention, showing a structure for attaching an ultrasonic sensing device to a sound receiving member.

Hereafter, an ultrasonic sensing device and a attachment structure for attaching an ultrasonic sensor according to the seventh embodiment of the present invention will be described with reference to FIG. 8.

In this embodiment, the ultrasonic sensor 10 and the cap member 30 are formed by resin molding of the sound receiving member 20 and are therefore formed as a single body together with the sound receiving member 20.

In addition, a part of the sound receiving member 20 is thus formed as the molding resin 40 which has a similar function to the molding resin 40 in the above embodiments. This embodiment can be applied to each of above embodiments.

Eighth Embodiment

Hereafter, an ultrasonic sensing device and an attachment structure of an ultrasonic sensor according to the eighth embodiment of the present invention will be described with reference to FIG. 9.

Figure 9:
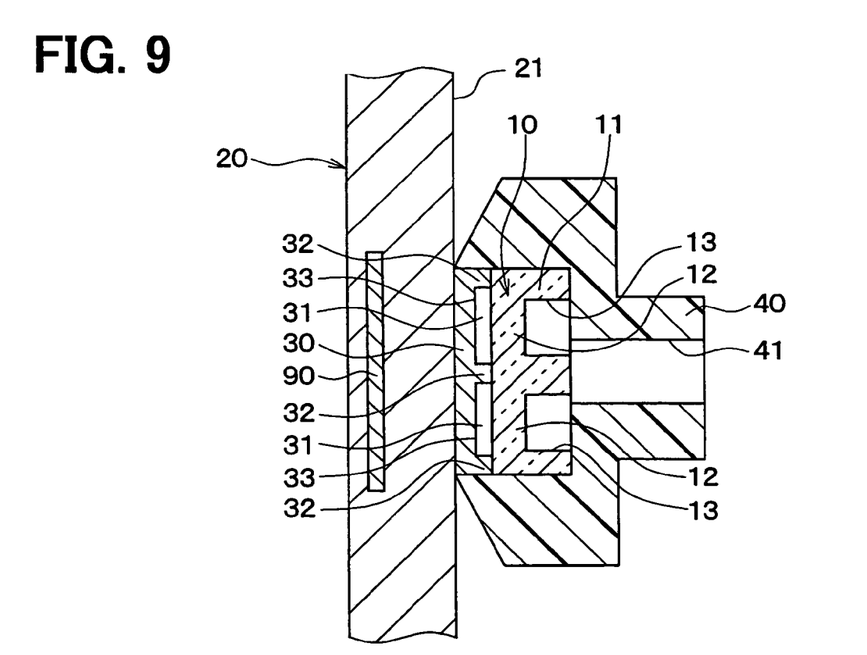
FIG. 9 is a cross sectional view of an ultrasonic sensing device according to an eighth embodiment of the present invention, showing a structure for attaching the ultrasonic sensor to a sound receiving member.

As shown in FIG. 9, a protection member 90 is installed at a portion of the ultrasonic sensor 10 and is mechanically stiffer than material for forming the sound receiving member 20. The portion to which the protection member is installed is close to a portion to which the ultrasonic sensor 10 is installed. Resilience of the sound receiving member 20 against destruction is therefore improved.

In the case that the sound receiving member 20 is made of resin, the protection member 90 may be a plate made of metal. In this case, the sound receiving member 20 is molded so that the protection member 90 is buried in an interior of the sound receiving member 20.

The protection member 90 may be attached to the surface of the sound receiving member 20 opposite to the sensor attachment surface 21. In this case, the protection member 90 may have a shape of an uneven board or a meshed sheet, as well as a shape of a plate. This embodiment can be applied to each of above embodiments.

Other Embodiments

The present invention should not be limited to the embodiments discussed above and shown in the figures, but may be implemented in various ways without departing from the spirit of the present invention.

The ultrasound transmitter 50 may be formed as a single body together with the semiconductor substrate 11 which constitutes the ultrasonic sensor 10.

The number of the membranes 12 may be one or more than three, if the membranes 12 are formed at portions of the semiconductor substrate 11, the portions being thin because of the recesses 13 at the rear surface of the semiconductor substrate 11.

The molding resin 40 is not necessary if the ultrasonic sensor 10 and the cap member 30 are sufficiently protected and the signal from the ultrasonic sensor 10 can be detected by another means.

Material having an acoustic impedance different from that of material composing the sound receiving member 20 may be filled in the groove 22. Alternatively, the groove 22 may be omitted.

In the case that the sensor attachment surface 21 of the sound receiving member 20 has a curved shape or an uneven shape, the cap member 30 may accordingly have a curved shape or an uneven shape fitting to the shape of the sensor attachment surface 21. The cap member 30 may have any kind of shape if one of its surfaces is attached to a portion of the front surface of the semiconductor substrate 11 surrounding the membranes 12 and the other one of its surfaces can be attached to the sound receiving member 20.

The attachment structure and the attachment method of the ultrasonic sensor to the sound receiving member of the present invention can be applied not only to a vehicle but also to any kind of other objects or bodies.

Such changes and modifications are to be understood as being within the scope of the present invention as defined by the appended claims.

What is claimed is:

1. A sensor attachment structure comprising:
   a sound receiving member for receiving an ultrasound;
   an ultrasonic sensor attached to the sound receiving member, the ultrasonic sensor including a semiconductor substrate having first and second surfaces opposite to each other and a substrate recess portion recessed from the first surface of the semiconductor substrate so as to form a membrane in the semiconductor substrate; and
   a cap member located between at least a section of the sound receiving member and the semiconductor substrate to cover the second surface of the semiconductor substrate, wherein:
   the membrane is provided such that the ultrasonic sensor detects the ultrasound based on the vibration of the membrane; and
   the cap member has a first surface bonded to the sound receiving member, and a second surface that is bonded to the second surface of the semiconductor substrate at an outer periphery section of the membrane while having a gap between the cap member and the membrane.

2. The sensor attachment structure according to claim 1, wherein a dimension of the gap between the cap member and the membrane is smaller than a recessed dimension of the recess portion.

3. The sensor attachment structure according to claim 1, wherein:
   the substrate recess portion includes a plurality of recesses that are provided so as to form a plurality of the membranes corresponding to the recesses in the semiconductor substrate, respectively;
   the second surface of the cap member is bonded to the second surface of the semiconductor substrate while having a plurality of gaps with the membranes, respectively;
   the cap member has a partition wall portion on the second surface, for partitioning the gaps from each other, and the partition wall portion is bonded to an adhesion portion of the semiconductor substrate between the membranes;
   the ultrasonic sensor detects the ultrasound based on vibrations of the membranes; and
   the partition wall portion is provided to suppress interference between vibrations of the membranes.

4. The sensor attachment structure according to claim 1, wherein the sound receiving member has an attachment surface to which the cap is attached, and a groove is formed on the attachment surface in a shape of loop surrounding the ultrasonic sensor.

5. The sensor attachment structure according to claim 1, wherein the cap member includes a bump by which the cap member is attached to the second surface at the outer periphery section of the membrane.

6. The sensor attachment structure according to claim 1, wherein at least one of the cap member and the semiconductor substrate is provided with an escape hole through which air in the gap between the cap member and the membrane escape.

7. The sensor attachment structure according to claim 1, wherein the gap is filled with a material having an acoustic impedance that is higher than an acoustic impedance of gas.

8. The sensor attachment structure according to claim 1, further comprising
   a guide member for guiding the ultrasonic sensor to the sound receiving member when the ultrasonic sensor is attached to the sound receiving member.

9. The sensor attachment structure according to claim 1, wherein:
   the sound receiving member has a thin portion that is thinner than the remaining portion; and
   the ultrasonic sensor is attached to the thin portion of the sound receiving member.

10. The sensor attachment structure according to claim 9, wherein:
    the sound receiving member is provided with a recess recessed from an attachment surface to have the thin portion; and
    the ultrasonic sensor is attached to the attachment surface of the sound receiving member at the thin portion.

11. The sensor attachment structure according to claim 9, wherein:
    the ultrasonic sensor is attached to an attachment surface of the sound receiving member at the thin portion; and
    the sound receiving member is provided with a recess recessed from a surface opposite to the attachment surface, to have the thin portion.

12. The sensor attachment structure according to claim 1, wherein:
    the sound receiving member is made of resin; and
    the ultrasonic sensor and the cap member are formed as a single body together with the sound receiving member by molding of the sound receiving member.

13. The sensor attachment structure according to claim 1, further comprising:

a protection member which is mechanically stronger than a material composing the sound receiving member, wherein the protection member is attached to an attachment section of the sound receiving member, to which the ultrasonic sensor is attached.

14. An ultrasonic sensing device to be mounted to a sound receiving member, the device comprising:

an ultrasonic sensor including a semiconductor substrate having first and second surfaces opposite to each other and a substrate recess portion recessed from the first surface of the semiconductor substrate so as to form a membrane in the semiconductor substrate; and a cap member located to cover the second surface of the semiconductor substrate, wherein:

the membrane is provided such that the ultrasonic sensor detects an ultrasound based on a vibration of the membrane; and the cap member has a first surface to be mounted to the sound receiving member, and a second surface that is bonded to the second surface of the semiconductor substrate at an outer periphery section of the membrane while having a gap between the cap member and the membrane.

15. The ultrasonic sensing device according to claim 14, wherein the gap between the cap member and the membrane is smaller than a recessed dimension of the recess portion.

16. The ultrasonic sensing device according to claim 14, further comprising a bump through which the second surface of the cap member is attached to the second surface at the outer periphery section of the membrane.

17. The ultrasonic sensing device according to claim 14, wherein at least one of the cap member and the semiconductor substrate is provided with an escape hole through which air in the gap between the second surface of the cap member and the membrane escape.

18. The ultrasonic sensing device according to claim 14, wherein the gap is filled with a material having an acoustic impedance that is higher than an acoustic impedance of gas.

19. Au ultrasonic sensing device to be mounted to a sound receiving member, the device comprising:

an ultrasonic sensor which includes a semiconductor substrate having first and second surfaces opposite to each other and a plurality of recesses recessed from the first surface so as to form a plurality of membranes corresponding to the recesses in the semiconductor substrate, respectively, and a cap member located to cover the second surface of the semiconductor substrate, wherein:

the ultrasonic sensor detects the ultrasound based on vibrations of the membranes;

the cap member has a first surface to be mounted to the sound receiving member, and a second surface that is bonded to the second surface of the semiconductor substrate at outer periphery sections of the membranes while having a plurality of gaps with the membranes, respectively; and the cap member has a partition wall portion on the second surface, for partitioning the gaps from each other, and the partition wall portion is bonded to an adhesion portion of the semiconductor substrate between the membranes.

20. The ultrasonic sensing device according to claim 19, wherein the partition wall portion is provided to suppress interference between vibrations of the membranes.

* * * * *